UNITED STATES PATENT OFFICE.

AUGUST LEOPOLD LASKA, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

DISAZO DYESTUFF.

982,507.     Specification of Letters Patent.     Patented Jan. 24, 1911.

No Drawing.     Application filed July 15, 1910. Serial No. 572,097.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with the post-office address Gerberstrasse 5, have invented new and useful Improvements in Disazo Dyestuffs, of which the following is a specification.

My invention relates to the manufacture and production of a new disazo dyestuff, which can be obtained by combining the tetrazo compound of the toluylenediamin sulfonic acid $$CH_3 : NH_2 : SO_3H : NH_2 = 1:2:4:6$$

with two molecules of the 2-amino-5-naphthol-7-sulfonic acid in acid solution. This dyestuff forms in the shape of its sodium salt a gray-brown powder, soluble in water with a yellow-red color and soluble in concentrated sulfuric acid with a yellowish Bordeaux color. It dyes cotton orange shades, which after combination with diazotized para-nitranilin of the fiber change into Bordeaux shades fast to washing and leaving after being discharged a pure white.

In order to illustrate the new process more fully the following example is given, the parts being by weight: 22.4 parts of the sodium salt of toluylenediamin sulfonic acid dissolved in 300 parts of water are cooled with ice and diazotized with 14 parts of sodium nitrite and 65 parts of hydrochloric acid (20° Bé.). An ice cold watery solution of 48 parts of 2-amino-5-naphthol-7-sulfonic acid neutralized with sodium carbonate is added. The mass of the reaction is stirred some time. I then add 35 parts of sodium acetate and I stir until the combination is complete. The temperature of the mixture is raised to 70° and the dyestuff is precipitated by addition of common salt from the acid solution. The dyestuff is dried and is mixed with the necessary quantity of sodium carbonate. It forms a gray-brown powder and dissolves in cencentrated sulfuric acid with a yellowish Bordeaux color, in water with a yellow-red color, which is altered by hydrochloric acid to yellow, by caustic soda lye to bluish-red. It dyes cotton orange shades which after combination with diazotized paranitranilin on the fiber change into Bordeaux shades fast to washing and leaving after being discharged a pure white.

Now what I claim and desire to secure by Letters Patent is the following:

1. The process of producing a disazo dyestuff consisting in combining the tetrazo compound of the toluylenediamin sulfonic acid $$CH_3 : NH_2 : SO_3H : NH_2 = 1:2:4:6$$

with two molecular proportions of the 2-amino-5-naphthol-7-sulfonic acid in an acid solution.

2. As a new article the disazo dyestuff obtained by combination of the tetrazo compound of the toluylenediamin sulfonic acid $$CH_3 : NH_2 : SO_3H : NH_2 = 1:2:4:6$$

with two molecular proportions of the 2-amino-5-naphthol-7-sulfonic acid in an acid solution, which dyestuff dyes cotton orange shades, which after combination with diazotized paranitranilin on the fiber change into Bordeaux shades fast to washing and leaving after being discharged a pure white, the dyestuff forming in the shape of its sodium salt a gray-brown powder, soluble in concentrated sulfuric acid with yellowish Bordeaux, in water with yellow-red color, which is altered by hydrochloric acid to yellow, by caustic soda lye to bluish-red.

In testimony, that I claim the foregoing as my invention, I have signed my name in presence of two witnesses, this 5th day of July 1910.

AUGUST LEOPOLD LASKA.

Witnesses:
   EVA SATTLER,
   HERMANN WEIS.